United States Patent [19]
Huff

[11] Patent Number: 5,117,373
[45] Date of Patent: May 26, 1992

[54] LOW PROFILE WEIGHT MEASURING SYSTEM FOR CONTAINERS

[75] Inventor: Larry D. Huff, Houston, Tex.

[73] Assignee: Load Cell Systems, Inc., Houston, Tex.

[21] Appl. No.: 524,848

[22] Filed: May 18, 1990

[51] Int. Cl.[5] .............................................. G06F 15/46
[52] U.S. Cl. ...................... 364/550; 364/567; 73/862.58
[58] Field of Search .............. 364/567, 558, 550; 73/820, 862.58; 414/21

[56] References Cited

U.S. PATENT DOCUMENTS

| | | | |
|---|---|---|---|
| 3,674,097 | 7/1972 | Gile | 364/567 X |
| 3,889,529 | 3/1975 | Bradley | 73/141 R |
| 3,895,681 | 4/1975 | Griffin et al. | 177/141 |
| 4,002,216 | 7/1977 | Solow | 177/208 |
| 4,108,261 | 11/1978 | Liberman et al. | 177/120 |
| 4,161,117 | 7/1979 | Decker et al. | 73/862.58 |
| 4,537,266 | 8/1985 | Greenberg | 73/862.58 X |
| 4,569,407 | 2/1986 | Gray et al. | 73/862.58 X |
| 4,773,027 | 9/1988 | Neumann | 364/550 |
| 4,796,212 | 1/1989 | Kitagawa | 364/567 X |
| 4,833,927 | 5/1989 | Park | 73/862.45 |
| 4,836,308 | 1/1989 | Davis et al. | 177/25.14 |
| 4,854,406 | 8/1989 | Appleton et al. | 414/21 X |
| 5,004,392 | 4/1991 | Naab | 414/21 |
| 5,016,197 | 5/1991 | Neumann et al. | 364/550 |

FOREIGN PATENT DOCUMENTS 5340573 11/1972 Australia.

Primary Examiner—Parshotam S. Lall
Assistant Examiner—S. A. Melnick

[57] ABSTRACT

An improved weight monitoring device that accurately monitors the weight of containers or other such heavy objects. The device allows for full legal loads in containers without overfilling the intended weight. A hydraulic load cell with an analog pressure transducer is coupled with an analog to digital converter to convert the analog signals into electronic digital signals which are then read by computer to determine results. The weight is conditioned by utilizing pressure and temperature amplifications, which allow the container to be zeroed and scaled to monitor the weight. This device utilizes a microprocessor to operate the electronic functions and to calculate the data. The data is stored in a read only memory chip to prevent tampering. The results can be read on sight or via downloading of information with a computer modem. The signals converted are linearly interpolated to produce highly accurate results. This device allows for timely weight reports and accurate management decisions. The load cells utilize a pre-charged chamber, or overfilling of the bladder to prevent deflection once the weight is placed upon the load cell. This load cell has a low 1 inch profile which allows for easier and less expensive installations.

2 Claims, 3 Drawing Sheets

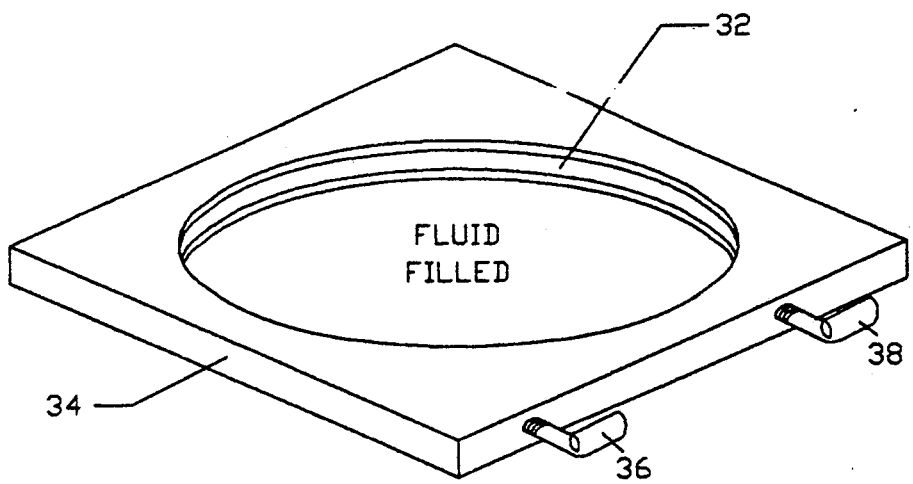
FIG. 2 -- HYDRAULIC LOAD CELL
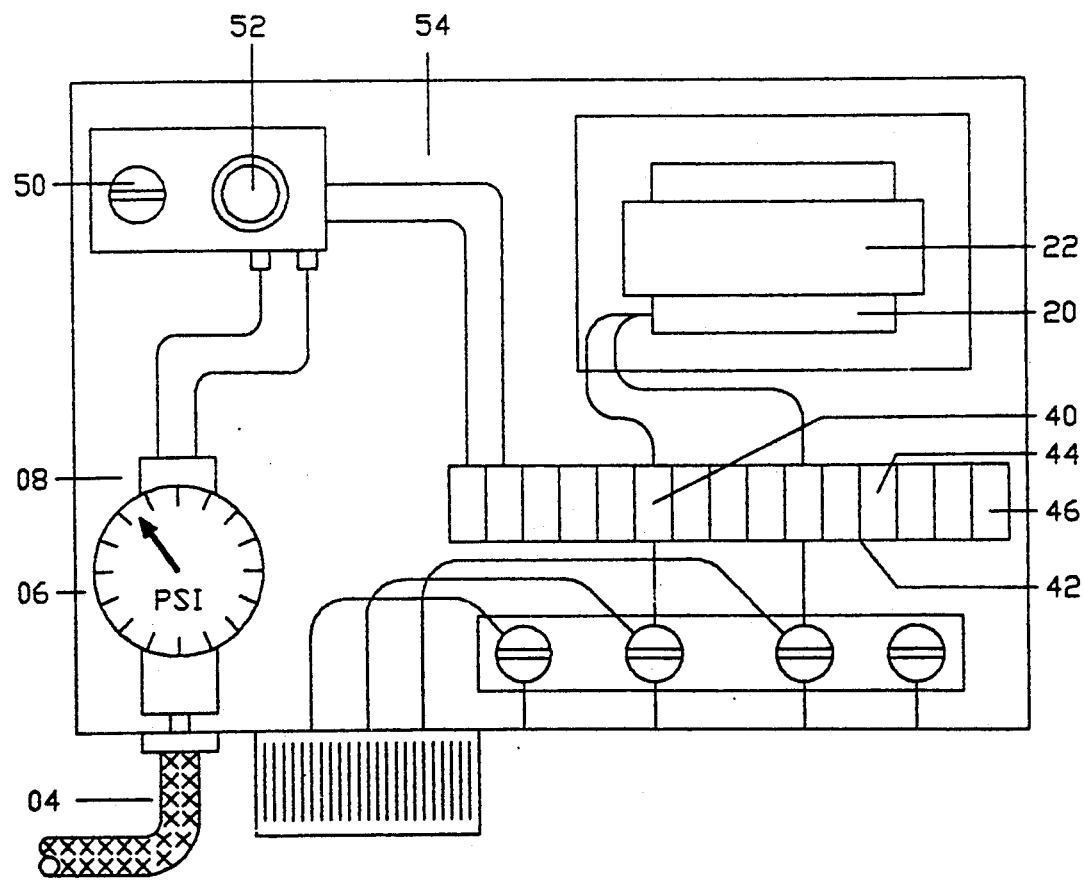
FIG. 3

LOW PROFILE WEIGHT MEASURING SYSTEM FOR CONTAINERS

BACKGROUND

1. Field of Invention

This invention relates to weight measurement, specifically to weight monitoring of load cells using both a hydraulic load cell and a central processing unit to interpolate data.

2. Description of Prior Art

"There is a large demand for the accurate load weight monitoring of roll off trash compactors and other containerized shipments that have a regulated shipping weight. The procedure typically utilizes a platform load cell device that weighs the truck and container being shipped before and after being unloaded to determine the weight of the payload. Using this method results in discovering overloads after the container is already loaded equiring costly unloading or unexpected fines." "Another commonly used method of determining container load weight for trash compactors is to interpolate container fullness from packing system pressure readings. Fullness estimates are then sued to assume load weight from past experience. This method fails for two reasons. First, packing pressure interpolations of container fullness vary significantly with content. Lighter contents such a cardboard yield higher packing resistance than heavier high liquid content materials. Second, packing pressures vary significantly with temperature of hydraulic fluids used in packing systems giving false readings especially in cold weather."

"Currently shippers are tying to maximize loads by filling containers completely, often overloading, while haulers are trying to avoid high overload fines and increasing revenues by frequent light loads, Since traditional load management methods fail to reconcile this dilemma, a device that continuously monitors load weight as containers are filled is needed to minimize shipper's costs through full legal loads while eliminating hauler's exposure to expensive fines."

OBJECTS AND ADVANTAGES

Accordingly we claim the following as our objects and advantages of the invention: to provide a method for accurately, easily, and inexpensively measuring the weight of containerized shipments such as trash compactor containers, to enable the user of the system to easily compare weight data through computer output.

Another advantage of this system is the low profile of the load cell system. By utilizing a small movable load cell, the system can be easily moved and setup in remote areas. This allows the accurate measurement of weight in any location with an inexpensive means. In addition, the data is easily down loaded from the system via telephone lines and a small modem within the system. This allows the consumer to easily determine the weight on sight and also to compare data of previous shipments to establish the proper intervals for hauling compactor containers. The host computer has the ability to monitor a multiplicity of compactors simultaneously through the use of software. This ability is especially useful to institutions that have more than one point of shipping, reducing each location's costs through centralized load weight management.

These advantages overcome the deficiencies of the current technology of determining packing pressures, and the technique of weighing a loaded truck and an unloaded truck to determine the weight of the container. This system allows for real time interpretation of weight and allows the consumer to determine when the container should be hauled. This system allows for full legal loads and the lowest hauling costs.

DESCRIPTION OF DRAWINGS

FIG. 2 is a perspective of the hydraulic load cell (02). This picture shows the fluid filled bladder. Metal plates forming the top and bottom are cambered by overfilling the bladder resulting in positive plate deflection from the pressure before the container to be weighed has been placed on the bladder. This cambering prevents negative deflection of the plate from heavy loads causing unreliable analog interpretations of weight. The load cell is fabricated from one quarter inch steel plate (32) and one half by one half inch steel strips (34). Welds must be of quality that will contain compression forces. Two holes are bored into one side of the bladder to provide for a fluid filler port (36) and a sensing pressure connection (38). The fluid filler port is a ¼" by ¼" NPT nipple with a back pressure valve and a cover cap. The sensing pressure fitting is a ¼" by ¼" NPT JIC straight or 90 degree adapter. Connecting hose (04) is ⅜" high pressure with ¼" JIC fittings on each end.

FIG. 3 is an overview of the electronic subsystem. This system functions as follows. Hydraulic sensing pressures are converted via a pressure transducer (06) to an electrical current which varies in voltage linearly with changes in hydraulic pressure. As voltage increases LED lights (40) are activated on the digital bar graph display (42). Lights activate from left to right as pressure increases. Each light in the display represents 5% of the total weight. When 16 lights are activated, 80% of capacity, a relay opens a switch which activates an amber warning light (44). As weight increases to 100% a second red light (46) is activated indicating the compactor has reached its legal load weight.

All instrumentation is enclosed in a liquid tight Hoffman enclosure (54). Power is taken from 110/120 source. The power is transformed to lower voltage to run functions.

Figure 1:
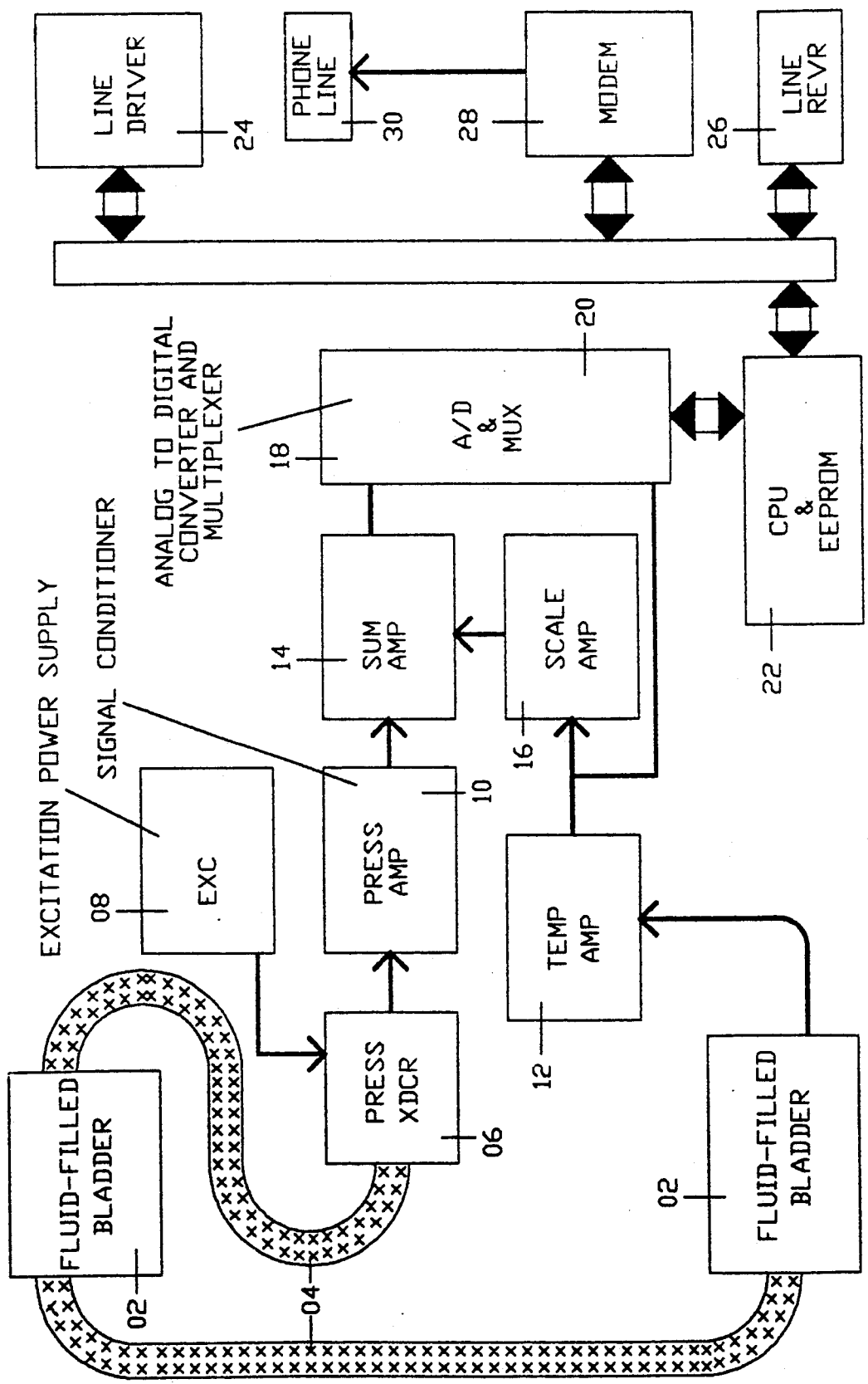
FIG. 1 is an overview of the weighing system. The fluid filled bladder (02) is the load cell, which is connected to the pressure transducer (06) via hydraulic fluid hose (04). The electronic components include a pressure amplifier (10), temperature amplifier (12), summation amplifier (14), scale amplifier (16), and an analog to digital converter (18). These components send various signals to the central processing unit (22). From the central processing unit the signals will be carried to the modem (28) and down loaded to a computer system via software.
Figure 4:
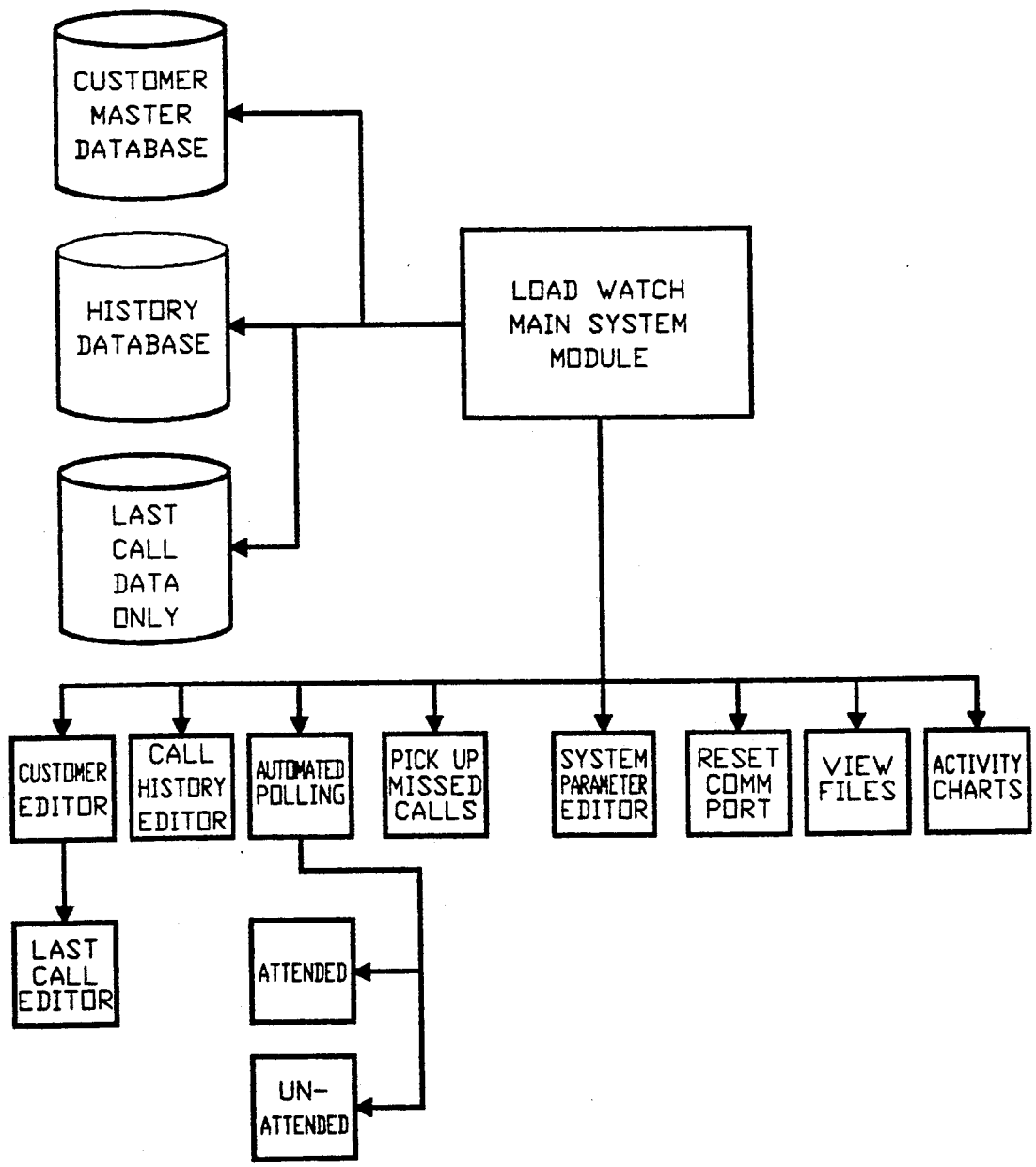

FIG. 4 details the software system overview. This software allows the data from the central processing unit (22) to be interpreted into useful information.

DRAWING REFERENCE NUMERALS

02— Hydraulic load cell
04— High pressure hydraulic hose
06— pressure transducer
08— excitation power supply
10— pressure amplifier
12— temperature amplifier
14— sum amplifier
16— scale amplifier 18— analog to digital converter
20— multiplexer
22— line driver
24— line driver
26— line reverser
28— modem
30— phone line
32— metal plate
34— metal strips
36— fluid filler port
38— sensing pressure connector
40— LED lights
42— bar graph display
44— amber warning light
46— red warning light
50— zeroing adjustment knob
52— scaling adjustment knob
54— Hoffman enclosure

LOW PROFILE WEIGHT MONITORING LOAD CELL OPERATION

The load cell is activated by rolling or placing upon the bladder the container that is needing to be weighed. The monitor will display the weight which will need to be zeroed in order to get the true weight of the contents. Then scale using zero adjusting knob (50). If no lights on (20) are on turn screw clockwise until first light on graph display (42) the leftmost light comes on. Turn the screw (50) counter-clockwise until the light just turns off remembering how much adjustment was required to turn the light off from full on. Continue turning counter-clockwise by a like amount. The scale is zeroed.

The second adjustment using the scaling adjustment knob (52) is accomplished after the container is ready to haul and just prior to pickup. While adjustments are being made, container should be picked up on previous scheduled to avoid overload. If all lights (40) are lit, turn knob (52) counter clockwise until extreme right light on bar graph display (42) and red "loaded" light (46) turn if then turn clockwise until these lights just turn on. Lock the adjusting knob (52).

Obtain the net weight of trash hauled. If, for example, the net weight is 10,000 pounds, when the lights on (42) have all lit during the next fill up there is 10,000 pounds of trash in the container. If heavier or lighter loads are desired, make adjustments while the compactor is loading. For example: Your setting is for 10,000 pounds. You desire 20,000 pound loads. When 50% of the lights on graph display (42) are lit, 10 lights, using the scale knob (52) turn counter clockwise until 25% of the lights, 5 lights, are lit. You have rescaled for 20,000 pounds. Confirm this setting by obtaining net weight of the next load and comparing to number of lights lit on display (42) just prior to pickup.

For example: If 18 lights are lit on display (42) then net weight should be 18,000 pounds or 90% of 20,000 pounds. Finer adjustments can be made to achieve more accuracy if desired.

Remotely Monitored Operation

With the remotely monitored device the same type of adjustments an tuning are required. Once the system has been adjusted, information is stored in the central processing unit and the read only memory chip. The system is connected to a phone line. To retrieve information the system is called and the information is downloaded to a central computer that contains the software. The software program is detailed in FIG. 5. The software program determines the number of rings and once the preset number has been achieved the modem will answer the call. The modem will then be initialized and allow for the transmission of data to the central computer. These and other changes and modifications which are obvious to those skilled in the art are intended to be included within the scope of the present invention.

The above description includes many specifics, which should not be construed as limitations on the scope of this invention, but as an example of one preferred embodiment thereof. Many other uses and forms are possible.

What is claimed is:

1. A weighing apparatus comprising:
   (a) a fluid containing steel bladder consisting of top and bottom plates separated by and sealed to low profile steel sides;
   (b) an over filling/pressuring of fluid to effect positive deflection of weight yielding plates; and
   (c) a pressure transducer hydraulically connected to said fluid filled bladder for generating an analog signal indicative of the weight of a containerized shipment.

2. A containerized shipment weighing system comprising:
   (a) a pressure transducer for generating an analog signal indicative of the weight of a containerized shipment taken from a weighing apparatus comprising (i) a fluid containing steel bladder consisting of top and bottom plates separated by and sealed to low profile steel sides; (ii) an over filling/pressurizing of fluid to effect positive defection of weight yielding plates; and (iii) a pressure transducer hydraulically connected to said fluid filled bladder for generating an analog signal indicative of the weight of a containerized shipment;
   (b) means for conditioning the analog signal including means for compensating for temperature and pressure noise on the analog signal;
   (c) means for converting conditioned analog signal to digital pulse signal;
   (d) means for transmitting said digital pulse signal to a host computer where a determination of the container's load weight is made.

* * * * *